United States Patent
Nagashima et al.

(10) Patent No.: US 6,607,832 B1
(45) Date of Patent: Aug. 19, 2003

(54) ULTRAVIOLET/INFRARED ABSORBENT GLASS, AN ULTRAVIOLET/INFRARED ABSORBENT GLASS PLATE, A COLORED FILM-COATED ULTRAVIOLET/INFRARED ABSORBENT GLASS PLATE AND A WINDOW GLASS OF A VEHICLE

(75) Inventors: Yukihito Nagashima; Isamu Kuroda; Mitsuhiro Kawazu; Toshifumi Tsujino, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/363,043

(22) Filed: Jul. 29, 1999

Related U.S. Application Data

(63) Continuation of application No. PCT/JP98/05616, filed on Dec. 10, 1998.

(30) Foreign Application Priority Data

| Dec. 26, 1997 | (JP) | ................................ 9-361584 |
| Jan. 12, 1998 | (JP) | ........................... 10-004040 |
| Jan. 30, 1998 | (JP) | ........................... 10-019927 |

(51) Int. Cl.⁷ ............................................. B32B 17/06
(52) U.S. Cl. ........................ 428/428; 428/208; 428/209; 428/426
(58) Field of Search ................................ 428/165, 208, 428/209, 426, 428

(56) References Cited

U.S. PATENT DOCUMENTS 5,362,689 A * 11/1994 Morimoto et al. ............ 501/70
5,976,678 A * 11/1999 Kawazu et al. ............. 428/208

FOREIGN PATENT DOCUMENTS

| JP | 2-80352 | 3/1990 |
| JP | 3-187946 | 8/1991 |
| JP | 5-58670 | 3/1993 |
| JP | 6-321577 | 11/1994 |
| JP | 6-345482 | 12/1994 |
| JP | 8-309930 | 11/1996 |
| JP | 9-208254 | 8/1997 |
| JP | 9-278481 | 10/1997 |
| JP | 9-286632 | 11/1997 |
| JP | 9-295829 | 11/1997 |
| JP | 9-295834 | 11/1997 |
| JP | 9-301743 | 11/1997 |
| JP | 09208254 | * 12/1997 |

* cited by examiner

Primary Examiner—Deborah Jones
Assistant Examiner—Andrew T Piziali
(74) Attorney, Agent, or Firm—Kanesaka & Takeuchi

(57) ABSTRACT

An ultraviolet/infrared absorbent glass plate includes base glass including 65 to 80 wt. % $SiO_2$; 0 to 5 wt. % $Al_2O_3$; 0 to 10 wt. % MgO; 5 to 15 wt. % CaO; 10 to 18 wt. % $Na_2O$; 0 to 5 wt. % $K_2O$; 5 to 15 wt. % a total amount of MgO and CaO; 10 to 20 wt. % a total amount of $Na_2O$ and $K_2O$; 0.05 to 0.3 wt. % $SO_3$; 0 to 5 wt. % $B_2O_3$; 0 to 1 wt. % $SnO_2$; and 0 to 350 ppm MnO; and colorants including 0.2 to 0.45 wt. % total iron oxide (T—$Fe_2O_3$) expressed as $Fe_2O_3$; 0.01 to 0.03 wt. % (excluding 0.03 wt. %) FeO; 0.8 to 2 wt. % $CeO_2$; 0 to 0.003 wt. % CoO; and 0 to 1.5 wt. % $TiO_2$. FeO expressed as $Fe_2O_3$ is 5 to 10 wt. % (excluding 10 wt. %) of T—$Fe_2O_3$, and the glass at any thickness in a range of 3.25 mm to 6.25 mm has visible light transmittance of equal to or more than 80% when measured by using CIE illuminant A.

34 Claims, No Drawings

ULTRAVIOLET/INFRARED ABSORBENT GLASS, AN ULTRAVIOLET/INFRARED ABSORBENT GLASS PLATE, A COLORED FILM-COATED ULTRAVIOLET/INFRARED ABSORBENT GLASS PLATE AND A WINDOW GLASS OF A VEHICLE

CROSS REFERENCE TO RELATED APPLICATION

This is a continuation application of PCT/JP98/05616 filed on Dec. 10, 1998

FIELD OF THE INVENTION

The present invention relates to an ultraviolet/infrared absorbent glass having a greenish color shade. Particularly, it relates to an ultraviolet/infrared absorbent glass and an ultraviolet/infrared absorbent glass plate which have a high visible light transmittance and a light greenish color shade so that it is useful for a window of a vehicle and a building, and also relates to a colored film-coated ultraviolet/infrared absorbent glass plate prepared by applying a colored film onto the ultraviolet/infrared absorbent glass plate and a window glass of a vehicle employing the colored film-coated ultraviolet/infrared absorbent glass plate.

BACKGROUND OF THE INVENTION AND RELATED ART STATEMENT

Recently, a variety of glasses having an ultraviolet/infrared absorptivity and a greenish color shade to be used as a vehicle windshield have been proposed with the view of preventing degradation of luxurious interior materials and reducing cooling load of the vehicle.

For example, an ultraviolet/infrared absorbent glass having a greenish color shade disclosed in the Japanese Patent H6-88812B consists of soda-lime-silica glass including colorants consisting of 0.65 to 1.25 wt. % the total iron oxide expressed as $Fe_2O_3$, 0.2 to 1.4 wt. % $CeO_2$ or 0.1 to 1.36 wt. % $CeO_2$ and 0.02 to 0.85 wt. % $TiO_2$.

An ultraviolet/infrared absorbent glass having a relatively lighter greenish color shade disclosed in the Japanese Patent H5-78147A consists of a base glass consisting of 68 to 72 wt. % $SiO_2$, 1.6 to 3.0 wt. % $Al_2O_3$, 8.5 to 11.0 wt. % CaO, 2.0 to 4.2 wt. % MgO, 12.0 to 16.0 wt. % $Na_2O$ and 0.5 to 3.0 wt. % $K_2O$ and colorants comprising 0.58 to 0.65 wt. % the total iron oxide expressed as $Fe_2O_3$, 0.1 to 0.5 wt. % $CeO_2$ and 0.1 to 0.4 wt. % $TiO_2$.

An ultraviolet/infrared absorbent glass disclosed in the Japanese Patent H8-208266A or the Japanese Patent H9-208254A has a relatively high visible light transmittance or a greenish color shade having high see-through visibility.

An ultraviolet/infrared absorbent glass disclosed in the Japanese Patent H8-208266A consists of soda-lime-silica glass including colorants comprising 0.52 to 0.63 wt. % the total iron oxide expressed as $Fe_2O_3$, 0.9 to 2 wt. % total $CeO_2$ and 0.2 to 0.6 wt. % $TiO_2$ wherein the iron having 2 valences expressed as $Fe_2O_3$ is 28 to 38 wt. % of the total iron oxide expressed as $Fe_2O_3$.

An ultraviolet/infrared absorbent glass disclosed in the Japanese Patent H9-208254A consists of a base glass comprising 67 to 75 wt. % $SiO_2$, 0.05 to 3.0 wt. % $Al_2O_3$, 7.0 to 11.0 wt. % CaO, 2.0 to 4.2 wt. % MgO, 12.0 to 16.0 wt. % NaO, 0.5 to 3.0 wt. % $K_2O$, 0.05 to 0.30 wt. % $S0_3$ and 0 to 1 wt. % $SnO_2$ and colorants comprising 0.40 to 0.90 wt. % the total iron oxide expressed as $Fe_2O_3$, 1.0 to 2.5 wt. % $CeO_2$, 0.1 to 1.0 wt. % $TiO_2$, 0.0010 to 0.040 wt. % MnO, 0.0001 to 0.0009 wt. % CoO and 0.0001 to 0.0010 wt. % $Cr_2O_3$.

The aforementioned conventional ultraviolet/infrared absorbent glasses generally have problems as followings.

An ordinary ultraviolet/infrared absorbent glass having a greenish color shade including the glass disclosed in the Japanese Patent H6-88812B is possibly improved in the ultraviolet and infrared absorptibity so far as the visible light transmittance is within a permissive range (for example, more than 70% when the glass is employed for a front windshield of a vehicle.) and has a relatively deep greenish color shade having the excitation purity in a range of 2.4 to 3.3%. However, a glass having a light greenish color shade is sometimes preferred for a window of a vehicle and for a window of a building.

A glass having a possibly high ultraviolet and infrared absorptivity with a high visible light transmittance can be required for a window of a building.

A glass plate can be employed for a window of a vehicle not only alone but with a variety of coatings applied onto a surface thereof. When the glass has a coating on a surface thereof, the coating reduces the visible light transmittance of the glass plate. Therefore, when the glass has a visible light transmittance having a value being proximity to a lower limit of the aforementioned permissive range before being applied with a coating, even if the value is in the permissive range (for example, a value of slightly more than 70%), the value of the visible light transmittance easily becomes less than 70% after applying the coating. In this case, the glass can be hardly applied with a desired coating thereon.

The ultraviolet/infrared absorbent glass disclosed in the Japanese Patent H5-78147A has a relatively lighter greenish color shade. The glass having a thickness of 5 mm has a visible light transmittance of 71% at most, which is not sufficiently high. Although the glass has a relatively lighter greenish shade having an excitation purity of equal to or less than 5%, specifically, the value of the excitation purity is equal to or more than 3.2% and its greenish color shade is not too light.

The ultraviolet/infrared absorbent glass disclosed in the Japanese Patent H8-208266A has a relatively high visible light transmittance and includes the total iron oxide expressed as $Fe_2O_3$ in a range of 0.52 to 0.63 wt. % and iron having two valences expressed as $Fe_2O_3$ in a range of 28 to 38 wt. % of the total iron oxide. Although the glass provides a high solar ray absorptivity, i.e. a low solar energy transmittance, the visible light transmittance of the glass is in a range of 72.0 to 74.4% when the glass has a thickness of 3.5 mm, in a range of 71.4 to 72.9% when the glass has a thickness of 5 mm, which is not too high in substantial.

Although the ultraviolet/infrared absorbent glass disclosed in the Japanese Patent H9-208254A has a relatively high see-through visibility and provides a high solar ray absorptivity, the visible light transmittance thereof is in a range 65.5 to 67.6% when the glass has a thickness of 5 mm, and it is not too high. The excitation purity thereof is equal to or more than 2.9% and the greenish color shade thereof is not too light. While this glass comprises coo and $Cr_2O_3$ as essential constituents in order to control the color tone of the glass easily, these constituents are not preferable to be included for the purpose of providing a light color shade and a high visible light transmittance because they deepen the color tone of the glass and reduce the visible light transmittance even when the glass includes them in small quantity.

The colored film-coated glass can be prepared in the ion exchanging process in which ultrafine grains of an inorganic salt including silver or copper enter into the glass base due to baking the glass applied with the-inorganic salt including silver or copper on a surface thereof to cause the transparent colloidal development, in the metallic film forming process in which a metallic film is flashed onto the glass base due to sputtering, or in the film forming process in which a film of metallic ultrafine grains is formed due to heating the glass base applied with the metallic salt compound dissolved into the solution of the metal alcoxide.

The color development due to the surface plasmon of the metallic ultrafine grains is superior in the heat resistance and the light resistance and has been used in coloring of the glass or the earthenware. For example, according to J. Sol-Gel. Sci. Techn. 305–312(1994), the colored film is obtained due to forming the fine grains of gold by heating the glass base applied with the solution of alcoxide including chloroaurate and silane.

In order to provide the glass with the ultraviolet absorptivity, the metallic oxide including zinc oxide, titanium oxide and cerium oxide is often applied on the glass base in the Sol-Gel process or sputtering process. Recently, the glass base far improved in the ultraviolet screening ability due to the cerium ion is produced in the floating process and becomes employed for a window glass of a vehicle positively. However, the glass having an ultraviolet screening ability is yet minor and only a few variety of the color tone thereof is provided.

Under the circumstances, a glass having various functions and colors is required. A glass disclosed in the Japanese Patent H9-295834 is provided with various colors in such a manner to coat the glass base with a film including silicon oxide and the fine grains of gold. However, the ultraviolet screening ability of this glass is not enough to satisfy the need of users.

A glass disclosed in the Japanese Patent H9-235141 is provided with a higher ultraviolet screening ability and various colors in such a manner to coat the glass base with a compound film having an ultraviolet absorbent film and a film including the fine grains of gold. However, glasses of a front door and a front windshield among glasses of doors of a vehicle are obligated to have a visible light transmittance of equal to or more than 70% and it is extremely difficult to provide the glass disclosed in the Japanese Patent H9-235141 with a high ultraviolet screening ability while maintaining a visible light transmittance of equal to or more than 70%. Further, the compound film having an ultraviolet absorbent film and a colored film is not preferable to be employed because it increases the manufacturing cost.

OBJECT AND SUMMARY OF THE INVENTION

It is an object of the present invention to solve the aforementioned conventional problems and to provide an ultraviolet/infrared absorbent glass which has a light greenish color shade, particularly an ultraviolet/infrared absorbent glass and an ultraviolet/infrared absorbent glass plate having a light greenish color shade and a high visible light transmittance so as to be useful for a window glass of a vehicle and a building, a colored film-coated ultraviolet/infrared absorbent glass plate prepared by coating the ultraviolet/infrared absorbent glass plate with a colored film, and a window glass of a vehicle employing the colored film-coated ultraviolet/infrared absorbent glass plate.

An ultraviolet/infrared absorbent glass of a first aspect of the present invention consists of a base glass comprising:

65 to 80 wt. % $SiO_2$;
0 to 5 wt. % $Al_2O_3$;
0 to 10 wt. % MgO;
5 to 15 wt. % CaO;
10 to 18 wt. % $Na_2O$;
0 to 5 wt. % $K_2O$;
5 to 15 wt. % a total amount of MgO and CaO;
10 to 20 wt. % a total amount of $Na_2O$ and $K_2O$;
0.05 to 0.3 wt. $SO_3$; and
0 to 5 wt. % $B_2O_3$,
and a colorant including:
0.2 to 0.55 wt. % the total iron oxide (T—$Fe_2O_3$) expressed as $Fe_2O_3$;
0.01 to 0.08 wt. % (excluding 0.08 wt. %) FeO;
0.8 to 2 wt. % $CeO_2$;
0 to 0.003 wt. % CoO; and
0 to 1.5 wt. % $TiO_2$,
wherein FeO expressed as $Fe_2O_3$ is in a range of 5 to 25 wt. % (excluding 25 wt. %) of T—$Fe_2O_3$.

An ultraviolet/infrared absorbent glass plate of a second aspect of the present invention is composed of the ultraviolet/infrared absorbent glass of the first aspect wherein the visible light transmittance is equal to or more than 80% when measured by using CIE illuminant A, the solar energy transmittance is equal to or less than 83%, and the ultraviolet transmittance specified by ISO is equal to or less than 17.5%.

A colored film-coated ultraviolet/infrared absorbent glass plate of a third aspect of the present invention is provided by applying the colored film with a thickness between 30 nm and 300 nm including the silicon oxide and the fine grains of gold onto the surface of the ultraviolet/infrared absorbent glass plate of the second aspect.

A window glass of a vehicle of a fourth aspect of the present invention consists of at least two glass plates laminated together with an inner layer of a transparent resin or a spacing wherein at least one of these glass plates employs the colored film-coated ultraviolet/infrared absorbent glass plate, the visible light transmittance is equal to or more than 70% when measured by using CIE illuminant A, the ultraviolet transmittance specified by ISO is equal to or less than 15%, and the chromaticity expressed as a, b by using the Lab coordinates is in ranges of $-3 \leq a \leq 10$ and $-6 \leq b \leq 3$ when measured by using CIE illuminant C.

DETAILED DESCRIPTION OF PREFERRED EMBODIMENTS

The description will be made as regard to an ultraviolet/infrared absorbent glass composition. It should be noted that components will be represented with percentage by weight.

$SiO_2$ is a principal component for forming skeleton of glass. Less than 65% $SiO_2$ lowers the durability of the glass and more than 80% $SiO_2$ raises the melting temperature of the glass so high. $SiO_2$ is comprised within a range of 65 to 80%.

$Al_2O_3$ is not an essential component but a component for improving the durability of the glass. More than 5% $Al_2O_3$ raises the melting temperature of the glass so high. $Al_2O_3$ is comprised within a range of 0 to 5%, preferably in a range 0.1% and 2.5%.

CaO improves the durability of the glass and adjusts the devitrification temperature and viscosity of the glass during molding. Less than 5% or more than 15% CaO raises the devitrification temperature of the glass. CaO is comprised within a range of 5 to 15%.

While MgO may not be comprised essentially, MgO can improve the durability of the glass and adjust the devitrification temperature and viscosity of the glass during molding just as CaO. More than 10% MgO raises the devitrification temperature. The durability of the glass is lowered when the total amount of MgO and CaO is less than 5%, while the devitrification temperature is increased when the total exceeds 15%. MgO is comprised in a range of 0 to 10% and the total amount of MgO and CaO is in a range of 5 to 15%.

$Na_2O$ prompts the glass to melt. The efficiency of promotion of melting becomes poor when $Na_2O$ is less than 10%, while the durability of the glass is lowered when $Na_2O$ exceeds 18%. $Na_2O$ is comprised in a range of 10 to 18%.

While $K_2O$ may not be comprised essentially, $K_2O$ can prompt the glass to melt just as $Na_2O$. $K_2O$ is preferable not to exceed 5% because of its expensive cost. Therefore, $K_2O$ is comprised in a range of 5 to 5%. The efficiency of promotion of melting becomes poor when the total of $Na_2O$ and $K_2O$ is less than 10%, while the durability of the glass is lowered when the total of $Na_2O$ and $K_2O$ exceeds 20%. The total amount of $Na_2O$ and $K_2O$ is in a range of 10 to 20 o%.

$SO_3$ prompts the glass to be purified. The efficiency of purification becomes poor in the usual dissolution process when $SO_3$ is less than 0.05%, while bubbles formed due to decomposition of $SO_3$ remain in the glass and the bubbles are easily formed during reboiling the glass when $SO_3$ is more than 0.3%. $SO_3$ is comprised in a range of 0.05 to 0.3%, preferably in a range of 0.05 to 0.15%.

$B_2O_3$ is not an essential component but a component for improving the durability of the glass, prompting to melt, and yet enhancing the ultraviolet absorption. The transmittance is reduced also at a visible range, so that the color of the glass is easy to be tinged with yellow and difficulties during molding are caused due to the vaporization of $B_2O_3$ when $B_2O_3$ exceeds 5%. $B_2O_3$ is comprised in a range of 0 to 5%.

Iron oxide is present in the form of $Fe_2O_3$ and the form of FeO in the glass. $Fe_2O_3$ is a component for improving the ultraviolet absorptivity coupled with $CeO_2$ given later and FeO is a component for improving the heat ray absorptivity.

The desired visible light transmittance and the desired solar ray absorptivity require the total iron oxide (T—$Fe_2O_3$) in a range of 0.2 to 0.55%, FeO in a range of 0.01 to 0.08% (excluding 0.08%) and the ratio of FeO/T—$Fe_2O_3$ (FeO is usually expressed as $Fe_2O_3$ when the ratio of FeO/T—$Fe_2O_3$ is determined.) in a range of 0.05 to 0.25 (excluding 0.25%). The solar ray absorptivity cannot be improved sufficiently when the total iron oxide (T—$Fe_2O_3$), FeO and the ratio of FeO/T—$Fe_2O_3$ are below the lower limit of the respective range, while the visible light transmittance is excessively reduced when these items exceed the upper limit respectively.

The ratio of FeO/T—$Fe_2O_3$ is raised (or lowered) by increasing (or decreasing) an amount of reducing agents added into the glass including a trace of the carbon, $SnO_2$ or the like. Therefore, the ratio of FeO/T—$Fe_2O_3$ can be controlled due to adjusting the amount of the reducing agents.

FeO is preferable to be in a range of 0.03 to 0.08% (excluding 0.08%), particularly T—$Fe_2O_3$ is in a range of 0.2 to 0.45%, FeO is in a range of 0.03 to 0.06% and the ratio of FeO/T—$Fe_2O_3$ is in a range of 0.10 to 0.25% (excluding 0.25%), more particularly the ratio of FeO/T—$Fe_2O_3$ is in a range of 0.10 to 0.20% so as to provide the higher visible light transmittance and the lower solar energy transmittance.

T—$Fe_2O_3$ is preferable to be in a range of 0.2 to 0.45%, FeO is in a range of 0.01 to 0.03% (excluding 0.03%) and the ratio of FeO/T—$Fe_2O_3$ is in a range of 0.05 to 0.10% (excluding 0.10%) so as to provide the particularly high visible light transmittance even if the solar energy transmittance is raised.

Under the aforementioned ranges of T—$Fe_2O_3$ and the ratio of FeO/T—$Fe_2O_3$, $CeO_2$ is required to be in a range of 0.8 to 2% to obtain the desired ultraviolet absorptivity. The ultraviolet absorptivity is insufficient when $CeO_2$ is less than 0.8%, while the visible rays having a short wavelength are excessively absorbed so that the desired visible light transmittance and chromaticity cannot be obtained when $CeO_2$ exceeds 2%.

Although CoO is not an essential component, CoO may be added suitably in such a range as not to lose the optical properties in the sights of the present invention for controlling the color tone to remove the unpreferable yellow tint. Since the glass is highly tinged with yellow particularly when the FeO and the ratio of FeO/T—$Fe_2O_3$ is reduced so as to improve the high transmittance, CoO is preferable to be added with a suitable amount of more than 0.0003% to remove the yellow tint. CoO should be not more than 0.003% since the glass is excessively tinged with blue and reduced in the visible light transmittance when CoO is added too much.

Although $TiO_2$ is not an essential component, $TiO_2$ may be added suitably in such a range as not to lose the optical properties in the sights of the present invention for improving the ultraviolet absorptivity. Since the glass is easily tinged with yellow when the $TiO_2$ is added too much, $TiO_2$ should be not more than 1.5%, preferably less than 0.2%, more preferably less than 0.1%.

MnO is not essential but useful for controlling the color tone and the ratio of FeO/T—$Fe_2O_3$ coupled with $Fe_2O_3$, FeO and $CeO_2$. MnO should be less than 350 ppm since an influence of coloring of MnO itself appears when MnO is added too much.

In the present invention, $SnO_2$ may be added into the glass having the aforementioned proportion in a range 0 to 1% as a reducing agent. While at least one among $Cr_2O_3$, NiO, $V_2O_5$, $MoO_3$ and the like may be further added as a ordinary colorant in such a range as not to lose the light greenish color shade in the sights of the present invention, the colorant is not very preferable to be added because it deepens the color tone of the glass and reduces the visible light transmittance.

The glass of the present invention at any thickness in a range of 3.25 mm to 6.25 mm is preferable to have optical properties as followings:

i) A visible light transmittance (Ya) is equal to or more than 80%, preferably equal to or more than 83% when measured by using the CIE illuminant A over the wavelength range of 380 nm to 770 nm.

ii) A dominant wavelength (Dw) is between 530 nm and 565 nm when measured by using the CIE illuminant C over the wavelength range of 380 nm to 770 nm.

iii) A chromaticity expressed as a, b by using the Lab coordinates (Hunter style) is in ranges of $-5 \leq a \leq -1$ and $1 \leq b \leq 5$, preferably $-4 \leq a \leq -2$, $1 \leq b \leq 5$.

iv) An ultraviolet transmittance (Tuv) specified by ISO 9050 is equal to or less than 17.5, preferably equal to or less than 14%.

v) A solar energy transmittance (Tg) is equal to or less than 83%, preferably equal to or less than 80%.

vi) An excitation purity (Pe) is equal to or less than 2.5% when measured by using the CIE illuminant C.

The ultraviolet/infrared absorbent glass plate of the present invention is made up from the ultraviolet/infrared absorbent glass having the aforementioned components and preferable to have a thickness between 3.25 mm and 6.25 mm and optical properties as followings:

1) A visible light transmittance (Ya) is equal to or more than 80%, preferably equal to or more than 83% when measured by using the CIE illuminant A over the wavelength range of 380 nm to 770 nm.
2) A dominant wavelength (Dw) is between 530 nm and 565 nm when measured by using the CIE illuminant C over the wavelength range of 380 nm to 770 nm.
3) A chromaticity expressed as a, b by using the Lab coordinates (Hunter style) is in ranges of $-5 \leq a \leq -1$ and $1 \leq b \leq 5$, preferably $-4 \leq a \leq -2$, $1 \leq b \leq 5$.
4) An ultraviolet transmittance (Tuv) specified by ISO 9050 is equal to or less than 17.5, preferably equal to or less than 14%.
5) A solar energy transmittance (Tg) is equal to or less than 83%, preferably equal to or less than 80%.
6) An excitation purity (Pe) is less than 2.5% when measured by using the CIE illuminant C.

The colored film-coated ultraviolet/infrared absorbent glass plate of the present invention is prepared by coating the ultraviolet/infrared absorbent glass plate with the colored film with a thickness between 30 nm and 300 nm including the silicon oxide and the fine grains of gold.

The ultraviolet/infrared absorbent glass plate employed in the colored film-coated ultraviolet/infrared absorbent glass plate is preferable to have the components mentioned above and a thickness between 1.0 mm and 6.0 mm, and more preferable to have a visible light transmittance of equal to or more than 80%, a solar energy transmittance of equal to or less than 80%, an ultraviolet transmittance of equal to or less than 17.5% and a chromaticity expressed as a, b by using the Lab coordinates in ranges of $-5 \leq a \leq -1$ and $1 \leq b \leq 5$ when the thickness of the glass is taken as 5 mm.

Hereinafter, the description will be made as regard to the colored film applied on the surface of the ultraviolet/infrared absorbent glass plate.

The colored film is colored by the surface plasmon absorption of the fine grains of gold included therein. The color tone of the film is altered through a shift of the absorption range of the spectral absorbent characteristics depending on an index of refraction of a matrix surrounding the fine grain of gold.

A colored film with a thickness between 30 nm and 300 nm including the fine grains of gold distributed in the matrix composed mainly of the silicon oxide is employed in consideration of durability in the present invention. The colored film is preferable to include the silicon oxide of more than 50 wt. % and not more than 95 wt. %, at least one selected from among the zirconium oxide, the tantalum oxide, the titanium oxide, the aluminum oxide and the cerium oxide in a range of 0 to 30 wt. %, the fine grains of gold for coloring in a range of 5 to 20 wt. % as the base constituents. The colored film may be applied onto both surfaces of the glass and is generally applied onto only one surface of the glass.

Hereinafter, constituents of the colored film will be described.

The silicon oxide is necessary as a matrix material having a small index of refraction to fix the fine grains of gold therein and to make the color development of the fine grains of gold reddish. The silicon oxide is further necessary to reduce the reflectance of the colored film. When the silicon oxide is contained too little, the reflectance rises excessively or the colored film becomes more blue because the surface prasmon absorption range of the fine grains of gold shifts to the long-wave part. When the silicon oxide is contained too much, the color of the colored film becomes pale and the efficiency of the silicon oxide becomes poor. Therefore, the content of the silicon oxide expressed as $SiO_2$ is more than 50 wt. % and not more than 95 wt. %, preferably between 60 wt. % and 93 wt. %.

The colored film of the present invention is preferable to include at least one selected from among the zirconium oxide, the tantalum oxide, the titanium oxide, the aluminum oxide and the cerium oxide (hereinafter, called as "color controlling constituents") so as to control the tone of the fine grains of gold having a reddish color in such a manner to tinge it with blue. The reflectance of the film becomes excessively high when the silicon oxide contained too much. The color controlling constituents expressed as $ZrO_2$, $Ta_2O_3$, $TiO_2$, $Al_2O_3$ and $CeO_2$ are preferable to be contained in a range of 0 to 30 wt. % in total, more preferably in a range of 0 to 15 wt. % in total.

The fine grains of gold is necessary to tinge the film with red through blue via purple. When contained too much, the fine grains of gold become to appear on the surface of the film to cause difficulty in uniform dispersion in the mass of the film and the durability of the film is reduced. While, when the fine grains of gold contain too little, the film is not sufficiently colored. The fine grains of gold is preferable to be contained in a range of 5 to 20 wt. %, particularly in a range of 7 to 18 wt. %.

Too thin film is not sufficiently colored and too thick film reduces the durability thereof to be cracked easily. The film is required to have a thickness between 30 nm and 300 nm, preferably between 50 nm and 250 nm, more preferably between 50 nm and 200 nm.

When the index of refraction of the film is too high, the colored film-coated ultraviolet/infrared absorbent glass plate is increased in reflectance and not preferable in view of appearance. The proportion of the composition of the film is controlled in such a manner that the film has the index of refraction in a range of 1.4 to 1.70, preferably in a range of 1.40 to 1.60, more preferably in a range of 1.45 to 1.55.

The colored film is prepared by means that the solution comprising a compound forming the fine grains of gold, a silicon oxide stock, stocks including the zirconium oxide, the tantalum oxide, the titanium oxide, the aluminum oxide and the cerium oxide as needed, catalysts, additives and an organic solvent is applied onto glass bases and then dried and baked.

Any silicon oxide stock is available so far as a transparent film with high strength can be formed in the Sol-Gel route and a superior stability can be secured. Such a silicon oxide stock is given as follows:

The metal alkoxide is suitable for the silicon oxide stock including tetramethoxysilane, tetraethoxysilane, tetrapropoxysilane, tetrabutoxysilane, a condensate condensing two or more among them ($n \geq 2$), and a mixture of the condensates.

Such a condensate employs hexaethoxydisiloxane (n=2), octoethoxytrisiloxane (n=3), decaetoxytetrasiloxane (n=4), ethoxypolysiloxane ($n \geq 5$) and the like. Ethylsilicate 40 consisting of a mixture containing monomers (n=1) and condensates (n=2) is preferably employed [the composition is shown on pages 253 through 268 of the document written by J. Cihlar under the title of "Colloids and Surface A: Physicochem. Eng. Aspects 70 (1993)", and comprises 12.8 wt. % monomer (n=1), 10.2 wt. % dimer (n=2), 12.0 wt. % trimer (n=3), 7.0 wt. % tetramer(n=4), 56.2 wt. % polymer ($n \geq 5$) and 1.8 wt. % ethanole].

Alkyltrialkoxysilane is also available wherein a part of alkoxy group of siliconalkoxyde is replaced by alkyl group for example by the linear or branched alkyl group including methyl group, ethyl group, propyl group, butyl group, 2-ethylbutyl group and octyl group, by cykloalkyl group including cyclopentyl group and cyclohexyl group, by alkenyl group including vinyl group, allyl group, γ-methacryloxypropyl group and γ-achryloxypropyl group, by aryl group including phenyl group, toluyl group and xylyl group, by aralkyl group including benzyl group and phenethyl group, and by γ-mercaptopropyl group, γ-chloropropyl group or γ-aminopropyl group.

The fine grains of gold can be obtained not only by using chloride including chloroaurate but by using sulfide of gold, cyano complex, halogeno complex thioic acid, thiosulfato acid, sulfito complex, auric acid, organogold compound or the like. Among them, chloroauric is preferable to be used because of its stability and ease of acquisition.

Organotitanium compound including titanium alkoxide, titanium acetylacetonate and titanium carboxylate is preferable to be used to obtain the titanium oxide. Titanium isopropoxide or titanium butoxide is employed for titanium alkoxide generally expressed by $Ti(OR)_4$ (R expresses alkyl group having 4 or less carbon atoms) in consideration of the reactivity. It is known that acetylacetonate is also preferable to be used because of its stability when obtaining the titanium oxide. In this case, titanium acetylacetonate is generally expressed by $Ti(OR)_mL_n$ (m+n=4, n≠0, L: acetylacetone). Titanium alkoxide may be varied into titanium acetylacetonate by acetylacetone. A commercial titanium acetylacetonate may be employed. Furthermore, carboxylic acid may be also employed.

Tetramethoxy zirconium, tetraethoxy zirconium, tetraisopropoxy zirconium, tetra-n-propoxy zirconium, tetraisopropoxy zirconium isopropanol complex, tetraisobutoxy zirconium, tetra-n-butoxy zirconium, tetra-sec-butoxy zirconium, tetra-t-butoxy zirconium and the like can be preferably employed as the zirconium oxide stock. Alkoxide of zirconium halogenate including zirconium monochloride trialkoxide formed by replacing alkoxy group of the compound expressed in the general formula (4) by halogen group, and zirconium dichloride dialkoxide can be also employed. Zirconium alkoxide formed by chelating the zirconium alkoxide by β-ketoester compound is also available.

Acetoacetic ester expressed by $CH_3COCH_3COOR$ (R expresses $CH_3$, $C_2H_5$ or $C_4H_9$) including methyl acetoacetate, ethyl acetoacetate, propyl acetoacetate and butyl acetoacetate is given as the aforementioned ketoester compound for the chelating agent. Among them, acetoacetic alkylester, particularly methyl acetoacetate and ethyl acetoacetate are suitable because they are available at relatively low cost. Zirconium alkoxide may be chelated with a part or entire thereof and is preferable to be chelated at (β-ketoester compound)/(zirconium alkoxide) rate of 2 expressed as molar ratio so that the chelate compound is stable. A chelating agent except for β-ketoester compound, for example zirconium alkoxide chelated by acetylacetone is deposited because of its insolubility in solvent including alcoholic and prevents from preparation of the coating solution.

The zirconium oxide stock can further employ alkoxyzirconium organic acid formed by replacing organic acid including acetic acid, propionic acid, butanoic acid, acrylic acid, methacrylic acid and stearic acidat for at least one of alkoxy groups of the zirconiumalkoxide.

Tantalumalkoxide and tantalum organic compound and the like are suitable for the tantalum oxide stock.

Cerium organic compound including ceriumalkoxide, ceriumacetylacetonate and ceriumcarboxylate can be preferably employed for the cerium oxide stock. While inorganic cerium compound including nitrate, chloride and sulfate can be also employed, cerium nitrate and ceriumacetylacetonate are more suitable because of their stability and ease of acquisition.

Aluminum alkoxide, organic aluminum compound and inorganic aluminum compound are suitable for the aluminum oxide stock.

Inorganic acid including hydrochloric acid, nitric acid and sulfuric acid or organic acid including acetic acid, oxalic acid, formic acid, propionic acid and p-toluensulfonic acid is employed for a hydrolytic catalyst, when alkoxide is employed for each stock of the silicon oxide, the zirconium oxide, the tantalum oxide, the titanium oxide, the aluminum oxide and cerium oxide. The content of these acids is in a range between 0.01 and 2, preferably in a range between 0.05 and 1.5 at the molar ratio against the metal alkoxide. In the hydrolyzing of the metal alkoxide, water content is required preferably in a range between 0.01 mol and 10 mol per 1 mol metal alkoxide.

As described above, the composition of the colored film has major constituents comprising the silicon oxide, gold and at least one selected, if necessary, from among the zirconium oxide, the tantalum oxide, the titanium oxide, the aluminum oxide and the cerium oxide for controlling the color of the film. In addition, the boron oxide having substantially the same efficiency as the silicon oxide may be contained, for example, contained at a rate of 15 wt. % or less, or a small amount of the bismuth oxide, the zinc oxide, the tin oxide, the indium oxide, antimony oxide, the vanadium oxide, the hafnium oxide, the chromium oxide, the iron oxide, the cobalt oxide and the like may be contained, for example, contained in total at a rate of 15 wt. % or less.

The organic solvents into which the materials constituting the colored film have been dissolved respectively are incorporated at a predetermined proportion to obtain the compound for forming the colored film as the coating liquid.

Types and a mixing proportion of the materials constituting the colored film are preferable to be arranged in consideration of the each compatibility between the employed solvent and the raw compound, the stability of the compound for forming the colored film and the color tone, the resistance of abrasion and the chemical durability of the colored film.

The organic solvent used in forming the colored film depends on the method of applying the compound for forming the colored film. When the colored film is formed in the gravure coating, the flexographic printing or the roll coating, the organic solvent is preferable to have a low evaporation rate because the solvent having a high evaporation rate evaporates before the film is sufficiently cared in the leveling process.

The evaporation rate of the solvent is generally evaluated by the relative index of the evaporation rate in which that of butyl acetate is taken as 100. A solvent having the index of equal to or less than 40 is classified as a solvent having an extremely low evaporation rate and is suitable for an organic solvent used in the gravure coating, the flexographic printing and the roll coating. For example, ethyl cellosolve, butyl cellosolve, cellosolve acetate, diethylene glycol monoethyl ether, hexylene glycol, diethylene glycol, ethylene glycol, tripropylene glycol, diacetone alcohol and tetrahydrofurfuryl alcohol are given.

The coating liquid of the present invention is preferred to include at least one among the aforementioned solvents, and may include plurals of the solvents for controlling the viscosity and the surface tension of the coating liquid.

Further a solvent having a high evaporation rate and over 100 relative evaporation rate including methanol (having the index of relative evaporation rate of 610), ethanol (having the index of relative evaporation rate of 340), n-propanol (having the index of relative evaporation rate of 300) may be added to the solvent having the index of relative evaporation rate of less than 40.

In the present invention, any method of applying the film is available and, for example, the spin coating, the dip coating, the spray coating and the printing are given. The printing including the gravure coating, the flexographic printing, the roll coating and the screen printing is preferable because it can bring a high productivity and apply the compound for forming the colored film efficiently.

In the present invention, the compound for forming the colored film is applied onto the glass base by the applying method mentioned above and then dried at the temperature between 100° C. and 400° C. for 5 to 20 minutes under the acidic atmosphere. After that, the colored film of the present invention having a thickness between 30 nm and 300 nm is formed by calcinating it at a temperature in a range of 500° C. to 700° C. or more for 10 seconds to 5 minutes. The fine grains of gold contributing the color developing is formed by drying and stabilized by calcination.

When the ultraviolet/infrared absorbent glass plate coated with the colored film onto only one surface thereof is employed for a windshield of a vehicle or a window glass of a building, the glass is preferable to be installed in a manner that the surface coated with the colored film thereon is directed to the inside of the vehicle or the building (or that the surface having no colored film thereon is directed to the outside of the vehicle or the building) so as to prevent damages to the colored film. In this case, since an excessively high visible light reflectance of the colored film-coated ultraviolet/infrared absorbent glass plate, particularly on the surface having no colored film, reduces the appearance by dazzling when seen from the outside of the vehicle or the building, the formulation of the colored film is recommended to be selected so that the visible light reflectance of the glass, particularly on the surface having no colored film is equal to or less than 10.0%.

The colored film-coated ultraviolet/infrared absorbent glass plate of the present invention is preferable to have a chromaticity expressed as a, b in ranges of $-3.0 \leq a \leq 10.0$ and $-6.0 \leq b \leq 3.0$, and a lightness expressed as L in a range of $40 \leq L \leq 90$ by using the Lab coordinates, particularly a chromaticity in ranges of $-2.0 \leq a \leq 8.0$ and $-5.0 \leq b \leq 2.0$, and a lightness in a range of $50 \leq L \leq 90$ when measured by using the CIE illuminant C.

The colored film-coated ultraviolet/infrared absorbent glass plate of the present invention is preferable to have a chromaticity including a improved by 1 to 10 and b reduced by 0 to 6 compared with those of the base of the glass. When the chromaticity expressed as a, b defined by the Lab coordinates of the colored film-coated ultraviolet/infrared absorbent glass plate of the present invention are taken as $a_2$, $b_2$ when measured by CIE illuminant C, and those of the ultraviolet/infrared absorbent glass plate which is the base of the colored film-coated ultraviolet/infrared absorbent glass plate are taken as $a_1$, $b_1$, the ultraviolet/infrared absorbent glass plate and the colored film-coated ultraviolet/infrared absorbent glass plate are preferable to have a relationship in ranges of $a_1+1 \leq a_2 \leq a_1+10$, $b_1-6 \leq b_2 \leq b_1$. When the colored film itself is tinged with red, the colored film-coated ultraviolet/infrared absorbent glass plate is preferable to have the chromaticity having a value of a increased by 4 to 10 and a value of b decreased by 2 to 6 compared to these of glass base, or preferable to have the relationship in ranges of $a_1+4 \leq a_2 \leq a_1+10$, $b_1-6 \leq b_2 \leq b_1-2$.

The colored film-coated ultraviolet/infrared absorbent glass plate is preferable to have an ultraviolet transmittance (Tuv) specified by ISO 9050 of equal to or less than 15%, particularly equal to or less than 12%, and a solar rays transmittance (Tg) of equal to or less than 80%.

Particularly, when the colored film-coated ultraviolet/infrared absorbent glass plate is employed for a window glass of a vehicle, the color of the reflected light from the surface directing to the outside of the vehicle or the reflected light seen from the side of the surface having no colored film of the glass is preferable to have an almost neutral grayish color in view of appearance and the chromaticity of in ranges of $-5.0 \leq a \leq 5.0$, $-5.0 \leq b \leq 5.0$, particularly in ranges of $-4.0 \leq a \leq 4.0$, $-4.0 \leq b \leq 4.0$. The visible light reflectance (Rg) of the surface having no colored film thereon and that of the surface coated with the colored film thereon are equal to or less than 10% respectively.

The colored film-coated ultraviolet/infrared absorbent glass plate of the present invention is preferable to have a thickness between 3.25 mm and 6.25 mm, the visible light transmittance of equal to or more than 70%, the ultraviolet transmittance of equal to or less than 15% and the chromaticity in ranges of $-3 \leq a \leq 10$, $-6 \leq b \leq 3$.

The colored film-coated ultraviolet/infrared absorbent glass plate of the present invention may be formed into the laminated glass due to laminating it to the other glass plate (a colored or non-colored glass plate having no colored film and a glass plate of the same type as the colored film-coated ultraviolet/infrared absorbent glass plate of the present invention are available.) with an inner layer comprising transparent resin materials including polyvinyl butyral and polyester and having a thickness between about 0.2 mm and 2.0 mm preferably in such a manner that the colored film is arranged to be directed inward (or to be faced with an inner layer). The colored film-coated ultraviolet/infrared absorbent glass plate may be also formed into the double glazing unit in a manner that the colored film-coated ultraviolet/infrared absorbent glass plate and the other glass plate are arranged with a spacing (for example between 0.1 and 3 mm) preferably in such a manner that the colored film is arranged to be directed inward and are sealed by hermetic sealing around them to form a laminate having an inner space filled with dry air or gas or having a high vacuum level. The weatherability of the colored film can be improved due to laminating or arranging the glasses in such a manner that the colored film is arranged to be directed inward.

The laminated glass or the double glazing unit in the state of lamination is preferable to have the visible light transmittance (Ya) of equal to or more than 70% when measured by the CIE illuminant A, the solar energy transmittance (Tg) of equal to or less than 80%, the ultraviolet transmittance (Tuv) specified by ISO 9050 of equal to or less than 15% and the chromaticity expressed as a, b by using the Lab coordinates in ranges of $-3 \leq a \leq 10$ and $-6 \leq b \leq 3$ and is suitable particularly for the window glass of the vehicle. The laminated glass or the double glazing unit is preferable to have a thickness between 1.0 mm and 4.0 mm, particularly between 1.0 mm and 3.5 mm.

A laminated glass prepared due to laminating the colored film-coated ultraviolet/infrared absorbent 2.5 mm thick glass plate having a predetermined dimension and a curved shape and the ultraviolet/infrared absorbent glass plate having no colored film and the same size and shape as the former in one piece via a film of 0.7 mm thick comprising polyvinyl butyral in such a manner that the colored film is faced with the polyvinyl butyral film is given by way of example. The laminated glass plate can be produced from the flat colored film-coated ultraviolet/infrared absorbent glass and ultraviolet/infrared absorbent glass plate in conventional glass bending and laminating process. The laminated glass is particularly suitable for a window glass of a front door of a vehicle (a side window glass being beside the driver's seat) or front windshield.

Hereinafter, preferable embodiments of the present invention will be described referring to examples and comparative examples.

In the following example and comparative examples, the optical properties of the glass are measured as followings:

visible light transmittance (Ya): JIS R3106 (measuring by using the CIE illuminant A)

dominant wavelength (Dw): JIS Z8701 (measuring by using the CIE illuminant C)

excitation purity (Pe): JIS Z8701 (measuring by using the CIE illuminant C)

color tone of the transmitted light (chromaticity a, b, lightness L): JIS Z 8722, JIS Z8730 (measuring by using the CIE illuminant C)

color tone of the reflected light (chromaticity a, b): JIS Z 8722, JIS Z8730 ultraviolet transmittance (Tuv): ISO 9050 solar energy transmittance (Tg): JIS R3106 visible light reflectance (Rg): JIS R3106

Hereinafter, some examples and comparative examples of the ultraviolet/infrared absorbent glass and the ultraviolet/infrared absorbent glass plate will be described.

EXAMPLES 1 THROUGH 14

Glass raw material is prepared by mixing the composition comprising the silica sand, the limestone, the dolomite, the soda ash, the salt cake, the ferric oxide, the titanium oxide, the cerium oxide, the slug ash and the carbonaceous reducing agent in proportions shown in Tables 1 through 3 in which the contents are expressed as the oxide and represented with percent by weight. Then, these six materials are heated and melted in an electric furnace at 1450° C. After 4 hours melting, the molten glass is flowed onto a stainless plate and annealed to the room temperature to obtain an about 10 mm thick glass plate. The composition of the glass plate has a proportion shown in Tables 1 through 3 respectively in which the richness of each constituent is represented with percent by weight.

TABLE 1

|  | Example 1 | Example 2 | Example 3 | Example 4 | Example 5 |
|---|---|---|---|---|---|
| $SiO_2$ | 70.4 | 71.0 | 70.5 | 70.4 | 70.4 |
| $Al_2O_3$ | 1.45 | 1.4 | 1.55 | 1.4 | 1.5 |
| MgO | 4.2 | 3.9 | 4.0 | 3.9 | 3.9 |
| CaO | 8.5 | 8.0 | 7.9 | 8.5 | 7.9 |
| $Na_2O$ | 13.0 | 13.0 | 13.3 | 12.9 | 13.0 |
| $K_2O$ | 0.7 | 0.7 | 0.7 | 0.6 | 0.7 |
| $SO_3$ | 0.12 | 0.11 | 0.11 | 0.11 | 0.10 |
| $T-Fe_2O_3$ | 0.30 | 0.30 | 0.30 | 0.30 | 0.30 |
| $CeO_2$ | 1.20 | 1.50 | 1.50 | 1.70 | 1.70 |
| $TiO_2$ | 0.17 | 0.07 | 0.17 | 0.17 | 0.50 |

TABLE 2

|  | Example 6 | Example 7 | Example 8 | Example 9 | Example 10 |
|---|---|---|---|---|---|
| $SiO_2$ | 70.4 | 70.3 | 71.1 | 70.5 | 70.7 |
| $Al_2O_3$ | 1.4 | 1.45 | 1.4 | 1.55 | 1.4 |
| MgO | 4.0 | 4.1 | 4.0 | 4.0 | 4.1 |
| CaO | 8.0 | 8.4 | 8.0 | 7.9 | 8.5 |
| $Na_2O$ | 13.0 | 12.9 | 13.0 | 13.2 | 12.9 |
| $K_2O$ | 0.7 | 0.7 | 0.7 | 0.7 | 0.6 |
| $SO_3$ | 0.10 | 0.12 | 0.11 | 0.11 | 0.11 |
| $T-Fe_2O_3$ | 0.30 | 0.38 | 0.45 | 0.45 | 0.50 |
| $CeO_2$ | 1.90 | 1.50 | 1.20 | 1.50 | 1.20 |
| $TiO_2$ | 0.17 | 0.17 | 0.07 | 0.07 | 0.07 |

TABLE 3

|  | Example 11 | Example 12 | Example 13 | Example 14 |
|---|---|---|---|---|
| $SiO_2$ | 70.4 | 71.0 | 70.6 | 70.6 |
| $Al_2O_3$ | 1.45 | 1.4 | 1.55 | 1.5 |
| MgO | 4.2 | 3.9 | 4.0 | 3.9 |
| CaO | 8.3 | 8.0 | 7.9 | 8.5 |
| $Na_2O$ | 13.0 | 13.0 | 13.3 | 12.9 |
| $K_2O$ | 0.7 | 0.7 | 0.7 | 0.6 |
| $SO_3$ | 0.12 | 0.11 | 0.11 | 0.11 |
| $T-Fe_2O_3$ | 0.30 | 0.30 | 0.28 | 0.28 |
| $CeO_2$ | 1.50 | 1.50 | 1.50 | 1.50 |
| $TiO_2$ | 0.07 | 0.07 | 0.07 | 0.07 |
| CoO | 0.0007 | 0.0009 | 0.0008 | 0.0010 |

The glass plates are polished to reduce the thickness to almost 3.5mm and then the optical properties of the plates are measured.

In Tables 4 through 6, the content of FeO, the relative content of FeO against the total content of the iron oxide (the ratio of $FeO/T-Fe_2O_3$) and the optical properties of each sample obtained in the manner mentioned above are shown.

TABLE 4

|  | Example 1 | Example 2 | Example 3 | Example 4 | Example 5 |
|---|---|---|---|---|---|
| FeO | 0.042 | 0.049 | 0.047 | 0.047 | 0.046 |
| $FeO/T-Fe_2O_3$ | 0.156 | 0.182 | 0.174 | 0.174 | 0.170 |
| Ya (%) | 87.3 | 87.4 | 86.7 | 86.6 | 86.3 |
| Tg (%) | 78.0 | 76.9 | 76.5 | 76.3 | 76.0 |
| Tuv (%) | 16.6 | 16.4 | 14.6 | 13.7 | 13.1 |
| Dw (nm) | 558 | 545 | 557 | 559 | 562 |
| Pe (%) | 1.6 | 1.1 | 1.8 | 2.0 | 2.5 |
| a | −2.3 | −2.4 | −2.5 | −2.6 | −2.7 |
| b | 2.1 | 1.6 | 2.3 | 2.6 | 3.1 |

TABLE 5

|  | Example 6 | Example 7 | Example 8 | Example 9 | Example 10 |
|---|---|---|---|---|---|
| FeO | 0.043 | 0.043 | 0.079 | 0.073 | 0.072 |
| $FeO/T-Fe_2O_3$ | 0.159 | 0.126 | 0.195 | 0.180 | 0.160 |
| Ya (%) | 86.6 | 87.0 | 84.3 | 84.7 | 84.8 |
| Tg (%) | 76.2 | 77.4 | 69.4 | 71.1 | 71.0 |
| Tuv (%) | 12.9 | 12.8 | 16.3 | 14.5 | 15.5 |
| Dw (nm) | 561 | 563 | 535 | 552 | 553 |
| Pe (%) | 2.3 | 2.2 | 1.2 | 1.8 | 2.0 |
| a | −2.7 | −2.9 | −3.5 | −3.4 | −3.4 |
| b | 2.8 | 3.4 | 1.8 | 2.3 | 2.7 |

TABLE 6

|  | Example 11 | Example 12 | Example 13 | Example 14 |
|---|---|---|---|---|
| FeO | 0.042 | 0.030 | 0.028 | 0.020 |
| FeO/T-$Fe_2O_3$ | 0.156 | 0.111 | 0.111 | 0.079 |
| Ya (%) | 85.1 | 85.1 | 85.7 | 85.6 |
| Tg (%) | 77.0 | 79.7 | 80.4 | 82.4 |
| Tuv (%) | 15.4 | 15.3 | 15.6 | 15.5 |
| Dw (nm) | 542 | 549 | 552 | 554 |
| a | −2.6 | −2.2 | −2.1 | −1.9 |
| b | 1.5 | 1.61 | 1.6 | 1.5 |

Tables 4 through 6 show that the samples of the present invention have a light greenish permeable color tone wherein the visible light transmittance (Ya) is equal to or more than 80% when measured by using the CIE illuminant A, the dominant wavelength (Dw) is between 530 nm and 565 nm when measured by using the CIE illuminant C, the excitation purity (Pe) is equal to or less than 2.5%, the ultraviolet transmittance (Tuv) of equal to or less than 17.5%, the solar light transmittance (Tg) of equal to or less than 83% (particularly in Tables 1 through 12, equal to or less than 80%), the chromaticity expressed as a, b by using the Lab coordinates has a value of a between −5 and −1 and a value of b between 1 and 5 when measured by using the CIE illuminant C.

Comparative Examples 1 through 3

Glass plates are prepared and optical properties of the glass plates are measured and shown in Table 8 in the same manner as Example 1 except for employing the proportion of the composition shown in Table 7. In Table 8, the richness of each constituent is represented with percent by weight except when being represented with ppm.

TABLE 7

|  | Comparative Example 1 | Comparative Example 2 | Comparative Example 3 |
|---|---|---|---|
| $SiO_2$ | 71.5 | 71.0 | 69.93 |
| $Al_2O_3$ | 1.45 | 1.7 | 1.96 |
| MgO | 4.0 | 3.5 | 3.46 |
| CaO | 8.0 | 8.0 | 7.93 |
| $Na_2O$ | 13.0 | 12.3 | 12.79 |
| $K_2O$ | 0.7 | 0.5 | 1.07 |
| $SO_3$ | 0.11 | 0.6 | 0.18 |
| T-$Fe_2O_3$ | 0.74 | 0.60 | 0.631 |
| $CeO_2$ | 0.50 | 1.23 | 1.70 |
| $TiO_2$ | 0 | 0.31 | 0.30 |
| CoO | — | — | 2.4 ppm |
| $Cr_2O_3$ | — | — | 2.0 ppm |

TABLE 8

|  | Comparative Example 1 | Comparative Example 2 | Comparative Example 3 |
|---|---|---|---|
| FeO | 0.165 | 0.189 | 0.024 |
| FeO/T-$Fe_2O_3$ | 0.248 | 0.35 | 0.395 |
| Ya (%) | 74.2 | 72.8 | 67.1 |
| Tg (%) | 47.8 | 45.5 | 37.3 |
| Tuv (%) | — | 7.9 | 4.8 |
| Dw (nm) | 499 | 519 | 517 |
| Pe (%) | 3.3 | 2.4 | 3.3 |
| a | — | — | — |
| b | — | — | — |

The sample of Comparative Example 1 has contents of $CeO_2$ and FeO outside the range of the present invention. The samples of Comparative Examples 2 and 3 have contents of the total iron oxide and FeO and the ratio of FeO/T—$Fe_2O_3$ outside the range of the present invention. Any sample of Comparative Examples 1 through 3 has a visible light transmittance (YA) of equal to or less than 80%, which is apparent to be not too high.

Hereinafter, some examples and comparative examples of the colored film-coated ultraviolet/infrared absorbent glass plate and the window glass of a vehicle will be described.

The proportion of the composition (represented with percent by weight) and the optical properties of the base glass used in the following Examples and Comparative Examples are shown in Table 9. The base glass has a thickness of 3.5 mm in the base glass 1, 3.5 mm in the base glass 2 and 4.80 mm in the base glass 4. Non-colored transparent base glass produced from soda-lime-silicate glass in the floating is prepared for the base glass 3 of Comparative Example 4.

TABLE 9

|  | glass base 1[*1] Examples 15–19 | glass base 2[*1] Example 20 | glass base 4[*2] Comparative Example 5 |
|---|---|---|---|
| $SiO_2$ | 71.0 | 70.5 | 70.4 |
| $Al_2O_3$ | 1.40 | 1.55 | 1.5 |
| MgO | 3.9 | 4.0 | 4.0 |
| CaO | 8.0 | 7.9 | 8.0 |
| $Na_2O$ | 13.0 | 13.3 | 13.0 |
| $K_2O$ | 0.70 | 0.70 | 0.70 |
| $SO_3$ | 0.11 | 0.11 | — |
| T-$Fe_2O_3$ | 0.30 | 0.30 | 0.55 |
| $CeO_2$ | 1.50 | 1.50 | 1.67 |
| $TiO_2$ | 0.07 | 0.17 | 0.14 |
| FeO | 0.049 | 0.049 | 0.140 |
| FeO/T-$Fe_2O_3$ | 0.182 | 0.182 | 0.25 |
| index of refraction | 1.51 | 1.51 | 1.51 |
| visible light transmittance (Ya) (%) | 87.4 (85.3) | 86.7 (84.6) | 71.9 |
| visible light reflectance (Rg) (%) | 7.2 (7.2) | 7.2 (7.2) | 6.6 |
| solar energy transmittance (Tg) (%) | 76.9 (71.0) | 76.5 (70.4) | 44.9 |
| ultraviolet transmittance (Tuv) (%) | 16.4 (12.9) | 14.6 (11.1) | 8.3 |
| dominant wavelength (Dw) (nm) | 545 (542) | 557 (556) | 523 |
| excitation purity (Pe) (%) | 1.1 (1.4) | 1.8 (2.0) | 2.45 |
| color tone (transmitted light) | pale green (pale green) | pale green (pale green) | green |
| chromaticity of the transmitted light a | −2.4 (−3.5) | −2.5 (−3.5) | −8.2 |
| chromaticity of the transmitted light b | 1.6 (2.1) | 2.3 (2.8) | 3.4 |
| chromaticity of the reflected light a |  |  | −1.9 |
| chromaticity of the reflected light b |  |  | −0.3 |

[*1]optical properties of the glass having a thickness of 3.5 mm, and in parenthesis, of the glass having a thickness of 5.0 mm
[*2]optical properties of the glass having a thickness of 4.8 mm

EXAMPLES 15 THROUGH 18

6 hydrated cerium nitrate is added into the ethyl cellosolve in such a manner to include 23.2 wt. % cerium oxide in a shape expressed as $CeO_2$ of a solid mater within the solution and then warmed at 90° C. for one hour to prepare a cerium nitrate stock solution A.

2 mol acetylacetone is dropped into 1 mol titanium isopropoxide being agitated by using a dropping funnel to prepare a titanium oxide stock solution B. The stock solution B includes 16.5 wt. % titanium oxide expressed as $TiO_2$ of a solid matter.

9 g 1.0 N hydrochloric acid and 41 g ethyl cellosolve are added into 50 g ethyl silicate ("Ethyl Silicate 40", Col Coat Co.) and then agitated at a room temperature for two hours to prepare a silicon oxide stock solution C. The stock solution C includes 20 wt. % silicon oxide expressed as $SiO_2$ of a solid matter.

130.1 g ethyl acetoacetate and 643.1 g ethyl cellosolve are added into 246.3 g aluminum(III)-s-butoxide and then agitated at a room temperature for two hours to prepare an aluminum oxide stock solution D.

27 g of 1.0N hydrochloric and 217.2 g of ethyl cellosolve are added into 103.9 g boron methoxide and then agitated at a room temperature for two hours to prepare a boron oxide stock solution E.

4 hydrated chloroauric acid is solved in ethyl cellosolve to prepare a chloroauric acid stock solution F having a concentration of 10 wt. %.

The cerium nitrate stock solution A, the titanium oxide stock solution B, the silicon oxide stock solution C, the aluminum oxide stock solution D, the boron oxide stock solution E and the chloroauric acid stock solution F are mixed together at a proportion shown in Table 10 and then ethyl cellosolve and, if necessary, 6 adducted trimethylolpropane acrylate ethylen oxide are added into the mixture with amounts shown in Table 10 to prepare coating liquids G through J.

The coating liquids G through J prepared in the manner mentioned above are applied respectively onto a surface of a sample of the base glass 1 having a thickness of 3.5 mm and an area of 100 mm×100 mm by spin coating at a revolution of 500 rpm to 1800 rpm as shown in Table 11. After dried by air, the samples are heated at 250° C. for 2 hours to separate the fine grains of gold. After that, the samples are baked at 720° C. for 120 seconds to provide the glass plates having the colored film. Examples 15 through 18 correspond to the colored film-coated ultraviolet/infrared absorbent glass plates applied with the coating liquid G through J in order respectively.

TABLE 10

| Examples | coating liquid | stock solution A (g) | stock solution B (g) | stock solution C (g) | stock solution D (g) | stock solution E (g) | stock solution F (g) | EC (g) | E06 (g) |
|---|---|---|---|---|---|---|---|---|---|
| 15 | G | 0.13 | 0.12 | 2.25 | — | — | 2.0 | 5.5 | — |
| 16 | H | — | — | 2.5 | — | — | 2.0 | 5.35 | 0.15 |
| 17 | I | — | — | 2.7 | 1.02 | — | 2.4 | 5.74 | — |
| 18 | J | — | — | 2.7 | — | 0.35 | 2.3 | 6.15 | — |

EC: ethyl cellosolve
E06: 6 adducted trimethylolpropane acrylate ethylele oxide

TABLE 11

| | condition of coating |
|---|---|
| Examples | spin revolution (rpm) |
| 15 | 1800 |
| 16 | 1500 |
| 17 | 1500 |
| 18 | 1500 |

The composition, the thickness and the index of refraction of each colored film are shown in Table 12. The visible light transmittance (Ya), the solar energy transmittance (Tg), the ultraviolet transmittance (Tuv), the chromaticity a, b and the lightness L of the transmitted light defined by Lab coordinates of each samples are shown in Table 13. The visible light reflectance on the glass surface, the chromaticity a, b defined by Lab coordinates of the reflected light on the glass surface of each samples measured respectively in such a manner to project a light from the side where the surface of the glass has no film are shown in Table 14. The visible light reflectance on the film surface and the chromaticity a, b defined by Lab coordinates of the reflected light on the film surface of each samples measured respectively in such a manner to project a light from the side where the surface of the glass has the colored film are also shown in Table 14. The thickness of each samples is measured by using feeler gauge.

TABLE 12

| Examples | film | composition of the film (wt. %) | | | | | | thickness of the film (nm) | index of refraction |
|---|---|---|---|---|---|---|---|---|---|
| | | $SiO_2$ | $TiO_2$ | $CeO_2$ | $Al_2O_3$ | $B_2O_3$ | Au | | |
| 15 | colored film | 75.7 | 3.35 | 5.00 | — | — | 16.0 | 130 | 1.50 |
| 16 | colored film | 84.0 | — | — | — | — | 16.0 | 120 | 1.46 |
| 17 | colored film | 70.8 | — | — | 13.2 | — | 16.0 | 130 | 1.49 |
| 18 | colored film | 74.5 | — | — | — | 9.46 | 16.0 | 120 | 1.47 |

TABLE 13

| Examples | visible light transmittance Ya (%) | solar energy transmittance Tg (%) | ultraviolet transmittance Tuv (%) | chromaticity and lightness of the transmitted light a/b/L |
|---|---|---|---|---|
| 15 | 74.7 | 74.0 | 13.6 | 6.1/−2.4/86 |
| 16 | 75.3 | 75.0 | 13.4 | 5.8/−1.5/87 |
| 17 | 73.5 | 76.2 | 12.8 | 6.5/−2.8/85 |
| 18 | 72.6 | 75.0 | 13.2 | 6.2/−1.8/86 |

TABLE 14

| Examples | visible light reflectance on the glass surface (%) | chromaticity of the reflected light on the glass surface a/b | visible light reflectance on the film surface (%) | chromaticity of the reflected light on the film surface a/b |
|---|---|---|---|---|
| 15 | 8.7 | 2.99/2.35 | 9.55 | 2.23/4.58 |
| 16 | 7.8 | 2.21/1.85 | 8.95 | 1.56/3.21 |
| 17 | 8.3 | 2.54/2.05 | 8.56 | 2.16/1.54 |
| 18 | 8.2 | 2.32/2.15 | 8.72 | 1.95/2.54 |

The colored films of Examples exhibit the preferable chemical resistance and resistance of abrasion. Each colored film-coated ultraviolet/infrared absorbent glass plate of Examples has the visible light transmittance (Ya) of equal to or more than 70%, the ultraviolet transmittance (Tuv) of equal to or less than 15%, solar energy transmittance (Tg) of equal to or less than 80%, the reflectance (Rg) on the glass surface of equal to or less than 10% and the reflectance (Rg) on the film surface of equal to or less than 10%. Each colored film-coated ultraviolet/infrared absorbent glass plate of Examples also exhibits the pale red tone of the transmitted light having the cromaticity defined by the Lab coordinates including a in a range of 5.8 to 6.5 and b in a range of −2.8 to −1.5 which is improved in the value of a by between 8.2 and 8.9 and reduced in the value of b by between 3.1 to 4.4 when compared to those of the base glass. The colored film-coated ultraviolet/infrared absorbent glass plate of Example 15 exhibits the dominant wavelength (Dw) of 520 nm and the excitation purity (Pe) of 4.2.

When the visible light transmittance, the solar energy transmittance and the ultraviolet transmittance of the base glass are taken as $Ya_1$, $Tg_1$ and $Tuv_1$ respectively, those of the colored film-coated glass plate are taken as $Ya_2$, $Tg_2$ and $Tuv_2$ respectively and those of the colored film itself are defined as $(Ya_2/Ya_1)$, $(Tg_2/Tg_1)$ and $(Tuv_2/Tuv_1)$ respectively, the colored film having $(Ya_2/Ya_1)$ of more than 82%, $(Tg_2/Tg_1)$ of less than 95% and $(Tuv_2/Tuv_1)$ of less than 85% can be obtained in Examples.

Comparative Example 4

2.5g silicon oxide stock solution C is added with 5.9 g ethyl cellosolve at first, and then added with 0.1 g 6 adducted trimethylolpropane acrylate ethylen oxide. After that, the solution is added with 1.5 g chloroauric acid stock solution F and agitated to prepare the coating liquid K.

The coating liquid K is applied onto the surface of the non-colored transparent soda-lime silicate glass base 3 having a thickness of 3.4 mm and an area of 100 mm×100 mm in the spin coating process at a revolution of 1500 rpm for 15 seconds. After dried by air, the sample is heated at 250° C. for 2 hours to separate the fine grains of gold. After that, the sample is baked at 720° C. for 120 seconds to provide the glass plate having the colored film.

The composition of the coating liquid, the number of revolution of the coating spin, and the composition, the thickness and the index of refraction of the colored film are shown in Table 15. The visible light transmittance (Ya), the solar energy transmittance (Tg), the ultraviolet transmittance (Tuv), the chromaticity expressed as a, b and the lightness expressed as L defined by the Lab coordinates of the transmitted light relating to the colored film-coated glass are shown in Table 16. The visible light reflectance on the surface of the glass, the chromaticity a, b defined by Lab coordinates of the reflected light on the surface of the glass measured respectively in such a manner to project a light from the side where the surface of the glass has no film are shown in Table 17. The visible light reflectance on the surface of the film and the chromaticity a, b defined by Lab coordinates of the reflected light on the surface of the film measured respectively in such a manner to project a light from the side where the surface of the glass has the colored film are also shown in Table 17.

Tables 16, 17 show that the colored film-coated glass has the visible light transmittance of equal to or more than 70%, the cromaticity having a reddish color tone, the ultraviolet transmittance (Tuv) of 49.7% which is higher than that of Examples 15 through 18 by 35% or more, and substantially no ultraviolet absorptivity.

TABLE 15

| Comparative Example | stock solution C (g) | E06 (g) | EC (g) | stock solution F (g) | spin revolution (rpm) | composition (wt. %) SiO$_2$ | Au | thickness of the film (nm) | index of refraction |
|---|---|---|---|---|---|---|---|---|---|
| 4 | 2.5 | 0.1 | 5.9 | 1.5 | 1500 | 84.0 | 16.0 | 122 | 1.46 |

EC: ethyl cellosolve
E06: 6 adducted trimethylolpropane acrylate ethylele oxide

TABLE 16

| Comparative Example | visible light transmittance Ya (%) | solar energy transmittance Tg (%) | ultraviolet transmittance Tuv (%) | chromaticity of the transmitted light a/b/L |
|---|---|---|---|---|
| 4 | 79.8 | 80 | 49.7 | 5.77/−1.66/87.8 |

TABLE 17

| Comparative Example | visible light reflectance on the glass surface (%) | chromaticity of the reflected light on the glass surface a/b | visible light reflectance on the film surface (%) | chromaticity of the reflected light on the film surface a/b |
|---|---|---|---|---|
| 4 | 7.11 | −0.82/0.36 | 6.53 | 4.55/−1.59 |

Comparative Example 5

2.5 g silicon oxide stock solution C is added with 5.85 g ethyl cellosolve at first, and then added with 0.15 g 6 adducted trimethylolpropane acrylate ethylene oxide. After that, the solution is added with 1.5 g chloroauric acid stock solution F and agitated to prepare the coating liquid L. The coating liquid L is applied onto the surface of the green-colored glass base 4 having a thickness of 4.80 mm and an area of 100 mm×100 mm in the spin coating process at a revolution of 2000 rpm for 15 seconds to prepare a sample. After dried by air, the sample is heated at 250° C. for 2 hours to separate the fine grains of gold. After that, the sample is reheated to 610° C. in 2 hours in the hot oven and retained therein for 10 minutes, and then the sample is cooled naturally to prepare the glass plates having the colored film.

The colored film comprises 87.5 wt. % $SiO_2$ and 12.5 wt. % Au and has the index of refraction of 1.48 and the thickness of 110 nm. The optical properties of the colored film including the visible light transmittance, the visible light reflectance, the color tone of the transmitted light and the like are shown in Table 18 in which the visible light transmittance (Ya) is shown to be less than 70%.

TABLE 18

| | |
|---|---|
| visible light transmittance (Ya) (%) | 66.7 |
| solar energy transmittance (Tg) (%) | 46.7 |
| ultraviolet transmittance (Tuv) (%) | 7.8 |
| chromaticity and lightness of the transmitted light (a/b/L) | −1.72/0.73/81.8 |
| visible light reflectance on the glass surface | 7.04 |
| chromaticity of the reflected light on the glass surface a/b | −0.82/0.88 |
| chromaticity of the reflected light on the film surface a/b | 2.88/0.87 |

EXAMPLES 19, 20

260.3 g ethylacetylacetate is added into 388.7 g tetrabutoxy zirconium and agitated for 2 hours to prepare the zirconium oxide stock solution M. The solution includes 17.8 wt. % zirconium oxide expressed as $ZrO_2$ of a solid matter.

60 g ethyl cellosolve is added into 40 g 6 hydrated cobalt nitrate and taken into solution to prepare the cobalt oxide stock solution N. The solution includes 10.3 wt. % cobalt oxide expressed as CoO of a solid matter.

The silicon oxide stock solution C, the zirconium oxide stock solution M, the cobalt oxide stock solution N and the chloroauric acid stock solution F are mixed at a proportion shown in Table 19. Then, ethyl cellosolve (EC) is added into the mixture at a rate shown in Table 19 to prepare the coating liquid "O".

The coating liquid "O" is applied onto one surface of the base glass 1 (in Example 19) and the base glass 2 (in Example 20) each of them having a thickness of 3.5 mm and an area of 100 mm×100 mm in the spin coating process at a revolution of 1200 rpm and 1500 rpm respectively to prepare samples. After dried by air, the samples are heated at 250° C. for 2 hours to separate the fine grains of gold. After that, the samples are baked at 720° C. for 120 seconds to prepare glass plates having a colored film.

TABLE 19

| Examples | stock solution C (g) | stock solution F (g) | stock solution M (g) | stock solution N (g) | EC (g) |
|---|---|---|---|---|---|
| 19, 20 | 4.0 | 2.0 | 0.5 | 0.5 | 4.5 |

The optical properties including composition, the thickness, and the index of refraction of the colored film and the visible light transmittance (Ya), the solar energy transmittance (Tg), the ultraviolet transmittance (Tuv), the chromaticity and the lightness of the transmitted light, the visible light reflectance and color tone of the reflected light are shown in Tables 20, 21.

The colored films exhibit the desired chemical resistance and resistance of abrasion. The colored film-coated glass plates have the visible light transmittance (Ya) of equal to or more than 70%, the ultraviolet transmittance (Tuv) of equal to or less than about 12%, the solar energy transmittance (Tg) of equal to or less than 80%, the visible light reflectance on the surface of the glass of equal to or less than 9% and the visible light reflectance on the surface of the colored film of equal to or less than 9%.

TABLE 20

| Examples | film | composition of the film (wt. %) | | | | thickness of the film (nm) | index of refraction |
|---|---|---|---|---|---|---|---|
| | | $SiO_2$ | $ZrO_2$ | CoO | Au | | |
| 19, 20 | colored film | 77.1 | 8.58 | 5.01 | 9.3 | 90 | 1.52 |

TABLE 21

| Examples | visible light transmittance Ya (%) | solar energy transmittance Tg (%) | ultraviolet transmittance Tuv (ISO) (%) | chromaticity and lightness of the transmitted light a/b/L |
|---|---|---|---|---|
| 19 | 73.5 | 74.8 | 12.3 | 4.9/−2.3/85 |
| 20 | 72.8 | 74.3 | 11.5 | 4.6/−1.9/84 |

TABLE 22

| Examples | visible light reflectance on the glass surface (%) | chromaticity of the reflected light on the glass surface a/b | visible light reflectance on the film surface (%) | chromaticity of the reflected light on the film surface a/b |
|---|---|---|---|---|
| 19 | 8.7 | 2.1/1.4 | 8.7 | 1.5/2.1 |
| 20 | 8.5 | 2.7/1.2 | 8.9 | 2.4/1.5 |

As detailed above, according to the present invention, the ultraviolet/infrared absorbent glass and the ultraviolet/infrared absorbent glass plate securing the relatively high visible light transmittance and having the superior ultraviolet absorptivity and the suitable infrared absoptivity can be provided without bringing an exceedingly deep greenish tone.

The ultraviolet/infrared absorbent glass and the ultraviolet/infrared absorbent glass plate of the present invention is available particularly for a glass desired to have a pale tone, a window glass of a vehicle applied with the coatings or a window glass of a building because of their relatively lighter greenish color tone and high visible light transmittance.

Further, according to the present invention, the colored film-coated ultraviolet/infrared absorbent glass plate having the high visible light transmittance, the reddish or the other colored tone and the superior ultraviolet transmittance can be provided. A desired window glass of a vehicle can be provided due to employing the colored film-coated ultraviolet/infrared absorbent glass plate.

What is claimed is:

1. An ultraviolet/infrared absorbent glass plate consisting of base glass consisting essentially of:

65 to 80 wt. % $SiO_2$;
0 to 5 wt. % $Al_2O_3$;
0 to 10 wt. % MgO;
5 to 15 wt. % CaO;
10 to 18 wt. % $Na_2O$;
0 to 5 wt. % $K_2O$;
5 to 15 wt. % a total amount of MgO and CaO;
10 to 20 wt. % a total amount of $Na_2O$ and $K_2O$;
0.05 to 0.3 wt. % $SO_3$;
0 to 5 wt. % $B_2O_3$;
0 to 1 wt. % $SnO_2$; and
0 to 350 ppm MnO;
and colorants consisting essentially of:
0.2 to 0.45 wt. % total iron oxide (T—$Fe_2O_3$) expressed as $Fe_2O_3$;
0.01 to 0.03 wt. % (excluding 0.03 wt. %) FeO;
0.8 to 2 wt. % $CeO_2$;
0 to 0.003 wt. % CoO; and
0 to 1.5 wt. % $TiO_2$,
wherein FeO expressed as $Fe_2O_3$ is 5 to 10 wt. % (excluding 10 wt. %) of T—$Fe_2O_3$, and the glass at any thickness in a range of 3.25 mm to 6.25 mm has visible light transmittance of equal to or more than 80% when measured by using CIE illuminant A.

2. An ultraviolet/infrared absorbent glass as claimed in claim 1, wherein CoO is 0.0003 to 0.003 wt. %.

3. An ultraviolet/infrared absorbent glass as claimed in claim 1, wherein $TiO_2$ is 0 to 0.2 wt. % (excluding 0.2 wt. %).

4. An ultraviolet/infrared absorbent glass as claimed in claim 3, wherein $TiO_2$ is 0 to 0.1 wt. % (excluding 0.1 wt. %).

5. An ultraviolet/infrared absorbent glass as claimed in claim 1, wherein said visible light transmittance is equal to or more than 83%.

6. An ultraviolet/infrared absorbent glass as claimed in claim 1, wherein the glass at any thickness in the range of 3.25 mm and 6.25 mm has dominant wavelength between 530 and 565 nm when measured by using CIE illuminant C.

7. An ultraviolet/infrared absorbent glass as claimed in claim 1, wherein the glass at any thickness in the range of 3.25 mm and 6.25 mm has chromaticity expressed as a, b by using Lab coordinates in ranges of $-5 \leq a \leq -1$ and $1 \leq b \leq 5$ when measured by using CIE illuminant C.

8. An ultraviolet/infrared absorbent glass as claimed in claim 7, wherein said chromaticity expressed as a, b by using the Lab coordinates in ranges of $-4 \leq a \leq -2$ and $1 \leq b \leq 5$.

9. An ultraviolet/infrared absorbent glass as claimed in claim 1, wherein the glass having at any thickness in the range of 3.25 mm and 6.25 mm has ultraviolet transmittance specified by ISO of equal to or less than 17.5%.

10. An ultraviolet/infrared absorbent glass as claimed in claim 9 wherein said ultraviolet transmittance is equal to or less than 14%.

11. An ultraviolet/infrared absorbent glass as claimed in claim 1, wherein the glass at any thickness in the range of 3.25 mm and 6.25 mm has solar energy transmittance of equal to or less than 83%.

12. An ultraviolet/infrared absorbent glass as claimed in claim 11, wherein said solar energy transmittance is equal to or less than 80%.

13. An ultraviolet/infrared absorbent glass as claimed in claim 1, wherein the glass at any thickness in the range of 3.25 mm and 6.25 mm has excitation purity of equal to or less than 2.5%.

14. An ultraviolet/infrared absorbent glass plate as claimed in claim 1, wherein the visible light transmittance is equal to or more than 80% when measured by using CIE illumination A, solar energy transmittance is equal to or less than 83%, and ultraviolet transmittance specified by ISO is equal to or less than 17.5%.

15. An ultraviolet/infrared absorbent glass plate as claimed in claim 14, wherein a dominant wavelength is in a range of 530 to 565 nm when measured by using CIE illuminant C and excitation purity is equal to or less than 2.5%.

16. An ultraviolet/infrared absorbent glass plate as claimed in claim 14, wherein said visible light transmittance is equal to or more than 83%.

17. An ultraviolet/infrared absorbent glass plate as claimed in claim 14, wherein chromaticity expressed as a, b by using Lab coordinates is in ranges of $-5 \leq a \leq -1$ and $1 \leq b \leq 5$.

18. An ultraviolet/infrared absorbent glass plate as claimed in claim 17, wherein the chromaticity expressed as a, b by using the Lab coordinates is in ranges of $-4 \leq a \leq -2$ and $1 \leq b \leq 5$.

19. An ultraviolet/infrared absorbent glass plate as claimed in claim 14, wherein solar light transmittance is qual to or less than 80%.

20. An ultraviolet/infrared absorbent glass plate as claimed in claim 14, wherein the glass has a thickness between 3.25 mm to 6.25 mm.

21. A colored film-coated ultraviolet/infrared absorbent glass plate wherein a colored film with a thickness between 30 nm and 300 nm including silicon oxide and fine grains of gold is applied onto a surface of the ultraviolet/infrared absorbent glass plate according to claim 14.

22. A colored film-coated ultraviolet/infrared absorbent glass plate as claimed in claim 21, wherein the colored film comprises the silicon oxide of more than 50 wt. % and equal to or less than 95 wt. %, at least one selected from the group consisting of zirconium oxide, tantalum oxide, titanium oxide, aluminum oxide and cerium oxide in a range of 0 to 30 wt. % and the fine grains of gold in a range of 5 to 20 wt. %.

23. A colored film-coated ultraviolet/infrared absorbent glass plate as claimed in claim 22, wherein the colored film comprises the silicon oxide in a range of 60 to 93 wt. %, at least one selected from the group consisting of the zirconium oxide, the tantalum oxide, the titanium oxide, the aluminum oxide and the cerium oxide in a range of 0 to 15 wt. % and the fine grains of the gold in a range of 7 to 17 wt. %.

24. A colored film-coated ultraviolet/infrared absorbent glass plate as claimed in claim 21, wherein chromaticity expressed as a, b by using Lab coordinates is in ranges of $-3 \leq a \leq 10$ and $-6 \leq b \leq 3$ and lightness expressed as L is in a range of $40 \leq L \leq 90$.

25. A colored film-coated ultraviolet/infrared absorbent glass plate as claimed in claim 24, wherein said chromaticity is in ranges of $-2 \leq a \leq 8$ and $-5 \leq b \leq 2$ and said lightness L is in a range of $50 \leq L \leq 90$.

26. A colored film-coated ultraviolet/infrared absorbent glass plate as claimed in claim 21, wherein when chromaticity expressed as a, b by using Lab coordinates of the colored film-coated ultraviolet/infrared absorbent glass plate is taken as $a_2$, $b_2$ when measured by CIE illuminant C, and that of the ultraviolet/infrared absorbent glass plate which is a base of the colored film-coated ultraviolet/infrared absorbent glass plate is taken as $a_1$, $b_1$ when measured by CIE illuminant C, the ultraviolet/infrared glass plate and the colored film-coated ultraviolet/infrared absorbent glass have a relationship in ranges of $a_1+1 \leq a_2 \leq a_1+10$, and $b_1-6 \leq b_2 \leq b_1$.

27. A colored film-coated ultraviolet/infrared absorbent glass plate as claimed in claim 26, wherein said relationship is in ranges of $a_1+4 \leq a_2 \leq a_1+10$, $b_1-6 \leq b_2 \leq b_1-2$.

28. A colored film-coated ultraviolet/infrared absorbent glass plate as claimed in claim 21, wherein ultraviolet transmittance specified by ISO is equal to or less than 15%.

29. A colored film-coated ultraviolet/infrared absorbent glass plate as claimed in claim 28, wherein the ultraviolet transmittance specified by ISO is equal to or less than 12%.

30. A colored film-coated ultraviolet/infrared absorbent glass plate as claimed in claim 21, wherein solar energy transmittance is equal to or less than 80%.

31. A colored film-coated ultraviolet/infrared absorbent glass plate as claimed in claim 21, wherein visible light transmittance is equal to or more than 70%.

32. A colored film-coated ultraviolet/infrared absorbent glass plate as claimed in claim 21, wherein the glass plate has a thickness between 3.25 mm and 6.25 mm, and has visible light transmittance of equal to or more than 70%, ultraviolet transmittance of equal to or less than 15% and chromaticity expressed as a, b by using Lab coordinates is in ranges of $-3 \leq a \leq 10$ and $-6 \leq b \leq 3$.

33. A window glass of a vehicle comprising at lest two glass plates laminated with an inner layer of a transparent resin or a spacing therebetween wherein at least one of said glass plates employs the colored film-coated ultraviolet/infrared absorbent glass plate as claimed in claim 21, the window glass having visible light transmittance measured by using CIE illuminant A of equal to or more than 70%, solar energy transmittance of equal to or less than 80%, ultraviolet transmittance specified by ISO of equal to or less than 15%, and chromaticity expressed as a, b by using Lab coordinates in ranges of $-3 \leq a \leq 10$ and $-6 \leq b \leq 3$.

34. A window glass of a vehicle as claimed in claim 33, wherein all of said at least two glass plates have a thickness between 1.0 to 3.5 mm and said at least one of said glass plates is installed in such a manner that a surface coated with the colored film is directed to an inner side of said window glass of a vehicle.

* * * * *